(12) United States Patent
Dmitriev-Zdorov

(10) Patent No.: US 10,237,097 B2
(45) Date of Patent: Mar. 19, 2019

(54) WORST CASE EYE FOR MULTI-LEVEL PULSE AMPLITUDE MODULATED LINKS

(71) Applicant: Mentor Graphics Corporation, Wilsonville, OR (US)

(72) Inventor: Vladimir B. Dmitriev-Zdorov, Longmont, CO (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 15/796,596

(22) Filed: Oct. 27, 2017

(65) Prior Publication Data

US 2018/0123840 A1    May 3, 2018

Related U.S. Application Data

(60) Provisional application No. 62/413,575, filed on Oct. 27, 2016.

(51) Int. Cl.
*H04L 25/49* (2006.01)
*H04L 27/00* (2006.01)
*H04B 17/29* (2015.01)
*H04B 17/373* (2015.01)

(52) U.S. Cl.
CPC ......... *H04L 25/4917* (2013.01); *H04B 17/29* (2015.01); *H04B 17/373* (2015.01); *H04L 27/0014* (2013.01); *H04L 2027/0075* (2013.01)

(58) Field of Classification Search
CPC .................................................. H04L 25/4917
See application file for complete search history.

(56) References Cited

U.S. PATENT DOCUMENTS

| | | | |
|---|---|---|---|
| 2004/0170231 A1* | 9/2004 | Bessios | H04L 25/4917 375/286 |
| 2010/0053793 A1* | 3/2010 | Mathew | G11B 5/09 360/39 |
| 2013/0041645 A1* | 2/2013 | Kawata | G06F 17/5036 703/14 |
| 2018/0123840 A1* | 5/2018 | Dmitriev-Zdorov | H04L 25/4917 |

* cited by examiner

*Primary Examiner* — Ross Varndell
(74) *Attorney, Agent, or Firm* — Mentor Graphics Corporation

(57) ABSTRACT

This application discloses a computing system to perform a fast evaluation of a worst case eye diagram for a channel capable of communicating signals encoding data in more than two value levels. The computing system can identify multiple step responses of the channel, each corresponding to a transition between a plurality of the value levels. The computing system can determine distribution boundaries of the signals at each of the value levels based, at least in part, on the step responses of the channel. The computing system can utilize the distribution boundaries at the value levels to determine boundaries of eye openings between adjacent value levels or to build worst case input patterns used to generate the worst case eye diagram for the channel. The computing system can predict a signal integrity of the channel based on the distribution boundaries at each of the value levels.

14 Claims, 8 Drawing Sheets

WORST CASE EYE FOR MULTI-LEVEL PULSE AMPLITUDE MODULATED LINKS

RELATED APPLICATION

This application claims priority to U.S. Provisional Patent Application Ser. No. 62/413,575, filed Oct. 27, 2016, which is incorporated by reference herein.

TECHNICAL FIELD

This application is generally related to electronic design automation and, more specifically, to determining a worst case eye for multi-level pulse amplitude modulated links.

BACKGROUND

Modern digital electronic circuits and systems can transmit or convey sequences of binary values, commonly referred to as bit sequences or digital signals. These bit sequences can be conveyed as voltage waveforms, wherein the voltage amplitude for a given time period or bit, corresponds to a binary logic value at that same time period. Accordingly, a digital signal can appear as a voltage waveform in the signal lines and transmission channels of electronic systems. As a digital signal is transmitted through a circuit, various effects may cause the signal to degrade, often to the point that errors occur. Errors within a digital signal may be quantified by a bit error rate. In many instances, the bit error rate of a circuit or signal pathway is defined as the ratio of incorrectly received bits to the total number of bits transmitted. An important consideration in digital electronic design is fidelity, or the quality with which a signal is conveyed. The fidelity of an electronic system is often referred to as signal integrity. As designers have increased the speed of operation and manufacturing has scaled the physical dimensions of today's modern circuits, signal integrity has become increasingly more important.

In an effort to increase data throughput on transmission channels, many designers are moving away from binary encoded transmissions—having either a high voltage level or a low voltage level transmitted on the transmission channel—during a time frame. Instead these designers are implementing signal encoding for transmission channels that have additional or intermediate voltage levels, more than two voltage levels, which can increase the amount of data transmitted during the same time frame. These multi-level signal encoding techniques, such as pulse amplitude modulated-4 or PAM-4, can increase complexity of transmission and reception processing, and determination of signal integrity for the transmission channels. For example, PAM-4 signaling can be sensitive to distortions of eye diagrams, both in voltage and in timing coordinates.

Digital electronic designers often employ techniques to determine signal integrity of their designs. For example, these designers can utilize simulation tools to perform time-domain simulation on the channel to identify signal integrity problems before the device is manufactured. These simulation tools can allow the designer to account for issues that commonly cause signal degradation, such as ringing, crosstalk, noise, ground bounce, or inter-symbol interference. Time-domain simulation, however, is often time and resource intensive. From a practical standpoint, many designers can only simulate a channel for around than 10,000,000 to 100,000,000 bits, which can provide a bit error rate of around 1e-7 to 1e-8, or one error every 10,000,000 to 100,000,000 bits. Current standards and reliability for channels, however, calls for bit-error rates (BER) of around 1e-12 to 1e-15, which would corresponding take four plus orders of magnitude longer to realize utilize time-domain simulation on the channel.

In an attempt to predict channel reliability in the face of the time-limitation imposed by bit-by-bit simulation, many designers implement peak distortion analysis. Peak distortion analysis often includes generation of a "worst-case input pattern" that, when input to the channel, would create a most-stressed or most-pessimistic prediction for an eye diagram associated with the channel. Another form of channel reliability prediction is statistical simulation of the channel. Statistical simulation can determine probability distributions that describe eye-diagrams, allowing predictions of the bit error rate BER as low as 1e-15 to 1e-20 bits and beyond, with minimal computational resources. A recently adopted Channel Operating Margin (COM) method for Serializer/Deserializer (SERDES) channel compliance evaluation can provide a pass or fail metric for modulated inputs. Since the COM method relies on a number of simplifications, for example, linearity of channel and a validity of superposition of channel's edge or symbol response, the COM method can be more computationally efficient than full statistical simulation. This computational efficiency, however, can come at the cost of considering transmitter non-linearity as a penalty, when in some instance it can be a benefit.

SUMMARY

This application discloses a computing system to perform a fast worst case eye evaluation for a channel capable of communicating signals encoding data in more than two value levels. In some embodiments, the computing system can identify multiple step responses of the channel, each corresponding to a transition between a plurality of the value levels. The computing system can determine distribution boundaries of the signals at each of the value levels based, at least in part, on the step responses of the channel. The computing system can utilize the distribution boundaries at the value levels to determine boundaries of eye openings between adjacent value levels or to build worst case input patterns used to generate the worst case eye diagram for the channel. The computing system can predict a signal integrity of the channel based on the distribution boundaries at each of the value levels. Embodiments are described in greater detail below.

DETAILED DESCRIPTION

Illustrative Operating Environment

Figure 1:
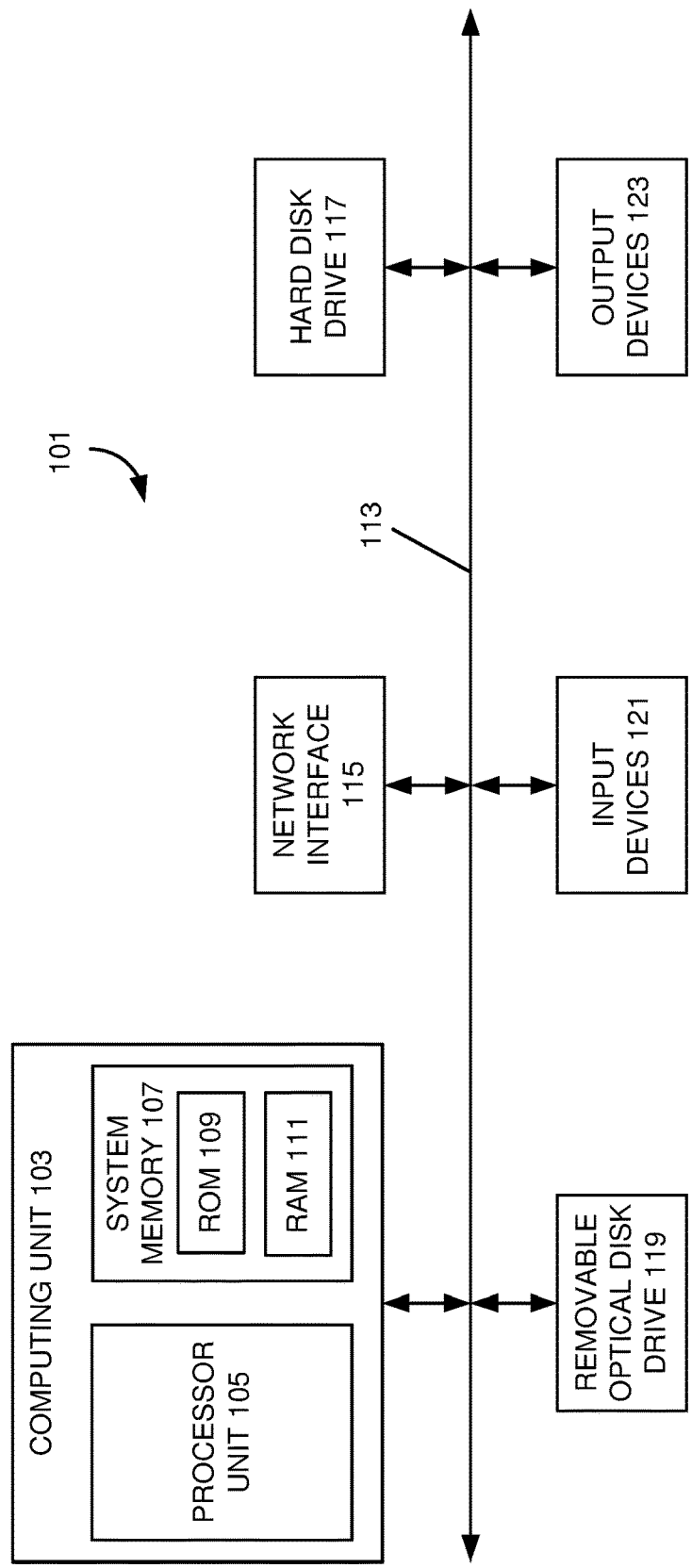
FIGS. 1 and 2 illustrate an example of a computer system of the type that may be used to implement various embodiments.

Various embodiments may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 117-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 117-123 may be internally housed with the computing unit 103. Alternately, one or more of the peripheral devices 117-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
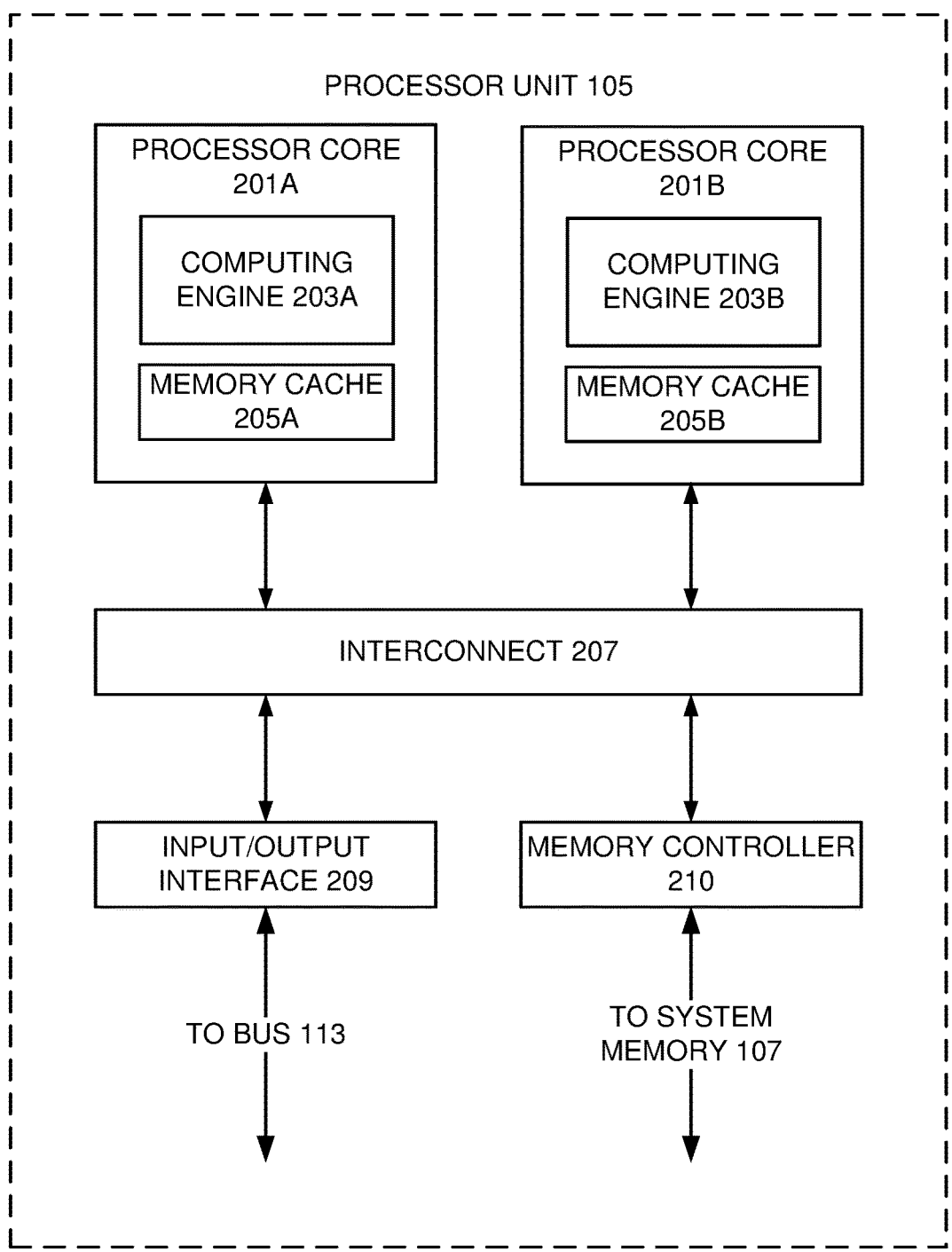

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments.

Detailed herein are methods, apparatuses, and systems for analyzing circuit channels, typically channels designed to carry high-speed signals. The disclosed methods, apparatus, and systems may be used, for example, in a printed circuit board or an integrated circuit design flow to analyze signal integrity. The disclosed methods, apparatus, and systems should not be construed as limiting in any way. Instead, the present disclosure is directed toward all novel and nonobvious features and aspects of the various disclosed methods, apparatus, systems, and equivalents thereof, alone and in various combinations and sub-combinations with one another. The present disclosure is not limited to any specific aspect or feature, or combination thereof, nor do the disclosed methods, apparatus, and systems require that any one or more specific advantages be present or problems be solved.

Although the operations of some of the disclosed methods, apparatus, and systems are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the figures may not show the various ways in which the disclosed methods, apparatus, and systems can be used in conjunction with other methods, apparatus, and systems. Additionally, the description sometimes uses terms like "generate" and "determine" to describe the disclosed methods. These terms are high-level abstractions of the actual operations that are performed. The actual operations that correspond to these terms may vary depending on the particular implementation and are readily discernible by one of ordinary skill in the art.

Various implementations may be employed to analyze a channel to determine signal integrity. For example, traces, vias or other interconnects between a driver and a receiver in a printed circuit board layout may be evaluated. The signal integrity of a digital circuit may, in some examples, be presented as a bit error rate, which can correspond to a measure of degradation a value sequence undergoes as a result of its being transmitted through the digital circuit. In addition to the bit error rate, the signal integrity of a channel is often analyzed by creating an "eye" diagram. Eye diagrams can be created through a variety of techniques, such as by repeatedly sampling a digital signal on the channel, for example, with signal measurement tools, such as an oscilloscope, and overlaying the various samples onto each other, by simulating transmission of the digital signals on the channel and overlaying simulated digital signals, by performing statistical simulation of the channel, by performing peak distortion analysis often includes generation of a "worst-case input pattern" that, when input to the channel, would create a most-stressed or most-pessimistic prediction for an eye diagram associated with the channel, or the like.

Figure 3:
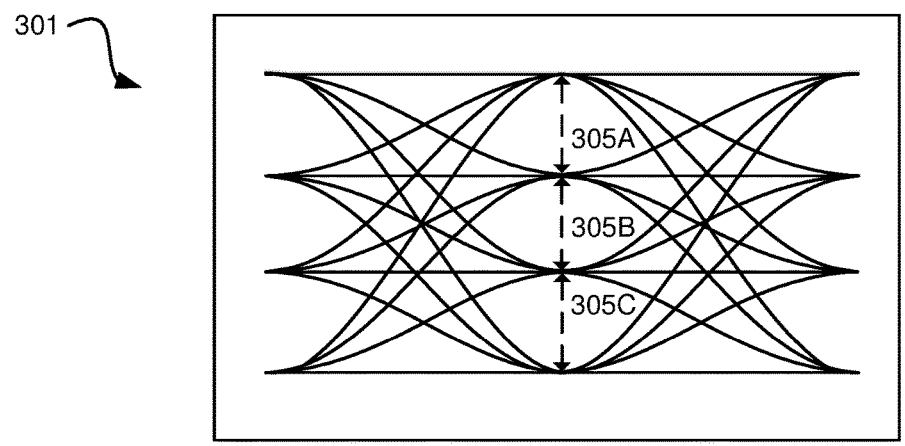
FIG. 3 illustrates an example undistorted eye diagram.

FIG. 3 illustrates an example undistorted eye diagram 301. Referring to FIG. 3, the undistorted eye diagram 301 can show various transitions on a channel carrying a four-level modulated signal, for example, a signal having a four-level pulse amplitude modulated (PAM) encoding, also called PAM-4 encoding. The x-axis of the undistorted eye diagram 301 can correspond to a unit interval for the channel, while the y-axis can correspond to an amplitude of a channel voltage. The unit interval can correspond to a period of time that a value can be transmitted over a channel, and the amplitude of the channel voltage during that time period can correspond to the value being transmitted during the unit interval.

The undistorted eye diagram 301 can overlap signals transmitted over multiple different unit intervals on the channel, for example, showing the signal as it transitions between different its different values. The undistorted eye diagram 301 can become distorted due to various electronic effects, for example, noise, timing issues, overshoot or undershoot can manifest themselves as amplitude and phase errors. Since these amplitude and phase errors can shrink the openings 305A-305C in the eye diagram 301, the openings 305A-305C in the eye diagram 301 can be utilized to quantify the errors in the transmission of signals over the channel.

Various implementations can analyze the signal integrity of a channel within an electronic device. For example, a printed circuit board, application-specific integrated circuits (ASICs), including mixed-signal application-specific integrated circuits, systems-on-a-chip (SoCs), programmable logic devices (PLDs), such as field programmable gate arrays (FPGAs), fiber-optic transmission networks, optical channels, such as an optical channel between two components of an integrated circuit. Furthermore, techniques can also be employed to evaluate the integrity of power carrying channels. As stated above, a physical electronic device may be employed in various implementations. However, with various other implementations, a simulated or statistically-simulated instance of the electronic device can be employed.

Any of the methods or techniques described herein can be performed using software that comprises computer executable instructions for causing a computer to perform the methods or techniques stored on one or more computer readable memory device. Such software can comprise, for example, an electronic design automation (EDA) tool, such as a signal integrity tool. The Hyperlynx tool available from Mentor Graphics Corporation of Wilsonville, Oreg. is one example of a suitable software tool. With various implementations, the software may be executed on a single computer. With other implementations, the software may be executed upon a networked computer system. For example, via the Internet, a wide-area network, a local-area network, a client-server network, or other such network. For clarity, only certain selected aspects of the software based implementations are described. Other details that are well known in the art are omitted. For example, it should be understood that the disclosed technology is not limited to any specific computer language, program, or computer and that the disclosed technology can be implemented using any commercially available computer. An illustrative computing environment is described, but it is to be understood that this environment is not limiting and although all possible computing environments are not described, those of skill in the art are still capable of practicing the invention based upon the following disclosure.

Various implementations may use circuit design information. For example, printed circuit board layout information, such as a .HYP file, device models such as IBIS models, netlists, GDSII descriptions, or HDL descriptions such as Verilog or VHDL description, or other similar layout or device design description stored on one or more computer readable memory device. In certain implementations, the circuits to be simulated are instantiated as SPICE or Eldo models for simulation. For presentation purposes, the present disclosure sometimes refers to circuit components by their physical counterparts, such as drivers, channels, signals, and other such terms. It should be understood, however, that any such reference not only includes the physical components but also representations of such circuit components and signals on the components as may be used in a computer implemented signal integrity analysis environment.

Electrical System Including a Channel

Figure 4:
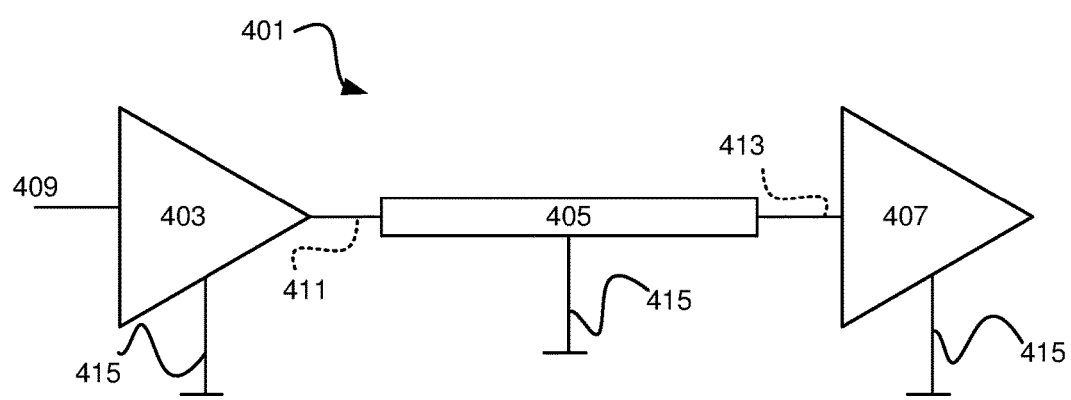
FIG. 4 illustrates an example electrical system.

FIG. 4 illustrates an exemplary electrical system 401. Referring to FIG. 4, the electrical system 401 includes a driver 403, a channel 405, and a buffer or receiver 407. With various implementations, the driver 403 can be a non-linear driver. In general, an electrical component can exhibit non-linear behavior when the sum of its responses does not equal the sum of its inputs. More particularly, in a linear system with a channel carrying binary signaling, the response to the bit sequence '010' summed with the response to the bit sequence '001' would equal the response to the bit sequence '011'. The principle of linearity is often explained mathematically as follows. Given a function F wherein $Y_1=F(X_1)$ and $Y_2=F(X_2)$, if $X_s=X_1+X_2$ then $Y=F(X_s)=Y_1+Y_2$. In a non-linear system, the response to the bit sequence '011' may not equal the summed responses to the bit sequences '010' and '001'. Employing the same function F, and $Y_1$, $Y_2$ and $X_s$ defined above, in a non-linear system $Y_s=F(X_s) \neq Y_1+Y_2$.

As can be seen in FIG. 4, the driver 403 includes an input 409 for receiving a digital signal, or d(t). Additionally, the driver 403 and the buffer 407 are connected by the channel 405. When a digital signal d(t) is placed on the driver 403 via the input 409, a response or voltage waveform, or V(t) is seen at the channel 405. The voltage waveform V(t) is often referred to as the driver voltage, or the transmitter voltage. The response of the driver 403 is measurable at a point 411 in the electrical system 401. Additionally, the response of the channel, or W(t), often referred to as the waveform at the receiver, or the receiver voltage, and is measurable at a point 413 in the electrical system 401. Furthermore, as can be seen in FIG. 4, the driver 403, the channel 405, and the buffer 407 are typically connected to a plurality of ground terminals 415.

As indicated above, the illustrative systems represented in FIG. 4, as well as other electrical systems may be actual physical devices. Accordingly, the signals, voltages and currents present in the system may be measured for example, by an oscilloscope. However, more often, various implementations will be practiced in conjunction with a simulated instance of the electrical system. Accordingly, the signals, voltages, currents and other values present in the system may be simulated as well.

Additionally, those of skill in the art will appreciate that various tools exists for describing an electrical system mathematically. More particularly, various mathematical tools exist for describing the properties of an electrical system in the time domain and the frequency domain. The equations described herein may be further modified and converted using the available tools, for example, the Laplace or Fourier transforms. Such conversions and modification of the described methods and exemplary implementations are within the scope of this disclosure.

Determining a Worst Case Eye for Multi-Level Pulse Amplitude Modulated Links

Figure 5:
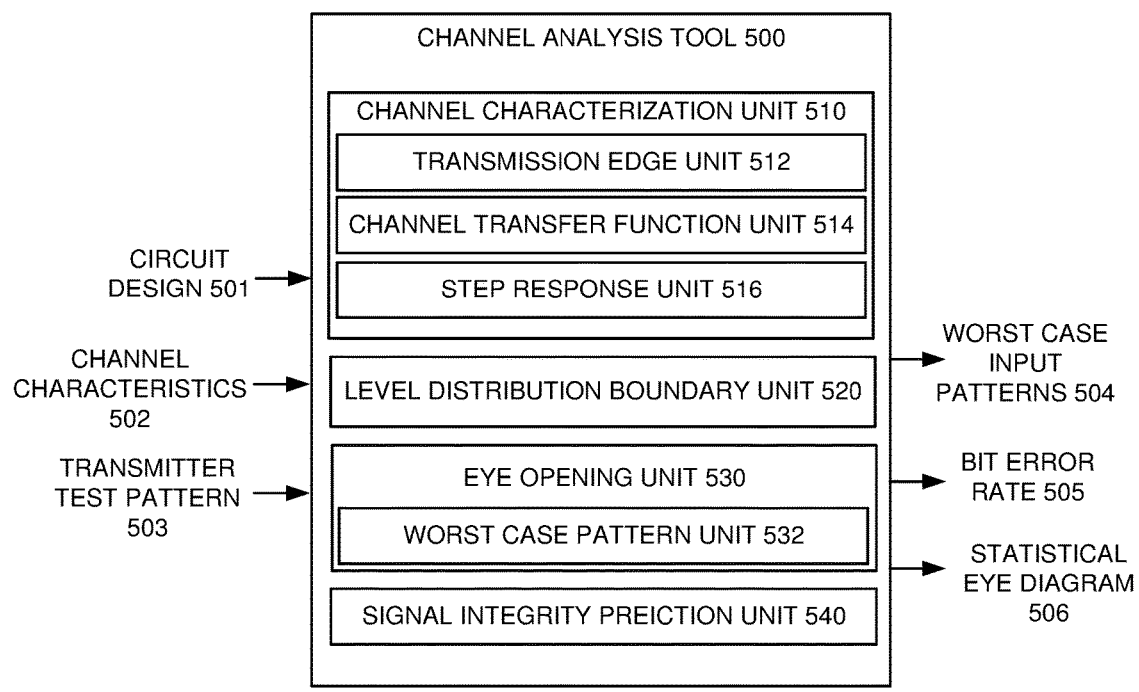
FIG. 5 illustrates an example channel analysis tool to perform fast worst case eye evaluation for a channel according to various embodiments.
Figure 6:
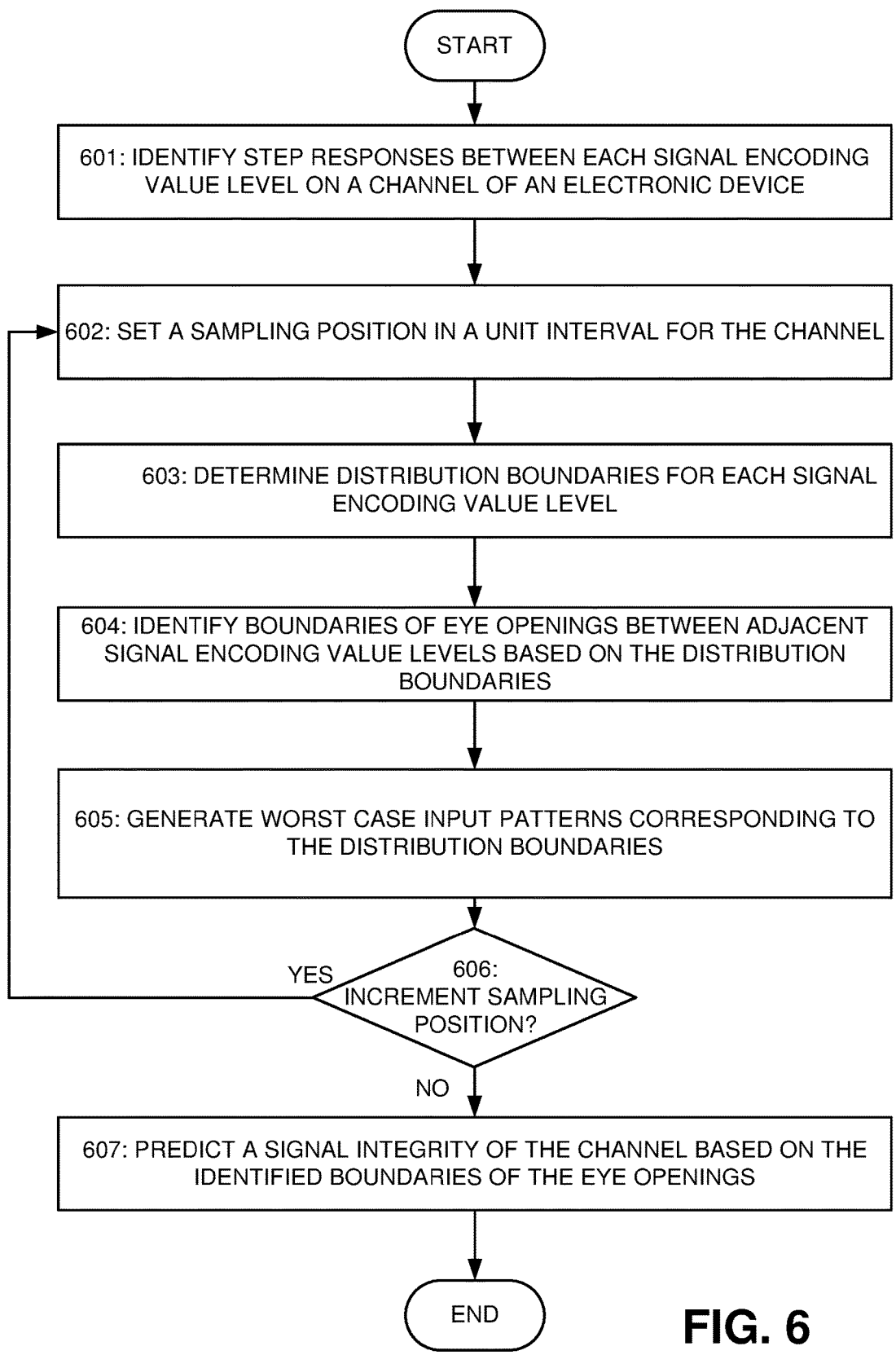
FIG. 6 illustrates a flowchart showing an example process for performing fast worst case eye evaluation for a channel in FIG. 5.

FIG. 5 illustrates an example channel analysis tool 500 to perform fast worst case eye evaluation for a channel according to various embodiments. FIG. 6 illustrates a flowchart showing an example process for performing fast worst case eye evaluation for a channel in FIG. 5. Referring to FIGS. 5 and 6, in a block 601, a computing system implementing the channel analysis tool 500 can identify step responses for a channel of an electronic device. A step response can correspond to a reaction of the channel to a voltage signal transition, for example, from one value level to a different value level through the channel. The channel analysis tool 500 can electrically characterize the channel by identifying each of the step responses, for example, a different step response for each value change capable of occurring on the channel.

The channel analysis tool 500 can include a channel characterization unit 510 to characterize the channel, which identifies the step responses of the channel. In some embodiments, the channel characterization unit 510 can characterize the channel by performing a circuit simulation of the channel described in a circuit design 501, e.g., using analytical models of the channel, SPICE models, IBIS models, transistor-level models, ideal voltage source models, or other such models. In other implementations, the step responses can be measured from a test chip or other physical chip implementing the channel under consideration. In some embodiments, the step responses can derived based on measured transmission waveforms and channel characteristics 502. In some embodiments, for example, when the channel is driven by a non-linear transmitter or driver, the shape of the step responses can be based on values having been transmitted over the channel prior to the value transition. The number of these previously transmitted values that can affect the shape of the step responses can be called a pre-history or history depth.

The channel characterization unit 510 can include a transmission edge unit 512 to determine transition waveforms generated by a driver of the channel, for example, the waveforms the driver inputs onto the channel. In some embodiments, the driver of the channel can generate signals having voltages that transition between each of the value levels, both rising and falling, in response to a transmission test pattern 503. An example transmission test pattern will be described below with reference to FIG. 7.

The transmission edge unit 512 may determine the transition waveforms by measuring voltages associated with value transitions at an output of the driver, for example, when the driver is attached to the channel, and utilize the measured voltages as the transition waveforms. For example, when the channel implements PAM-4 signaling with four signaling levels with no history depth, there can be 12 transition waveforms measured at the output of the driver associated with value transitions, such as transitions of value 0 to value 1, value 0 to value 2, value 0 to value 3, value 1 to value 0, value 1 to value 2, value 1 to value 3, value 2 to value 0, value 2 to value 1, value 2 to value 3, value 3 to value 0, value 3 to value 1, and value 3 to value 2. If, however, the channel implements PAM-4 signaling with four signaling levels with a history depth of one preceding value, there can be 240 value transitions measured at the output of the driver. These measured voltages can correspond to the transition waveforms for the driver of the channel.

Figure 7:
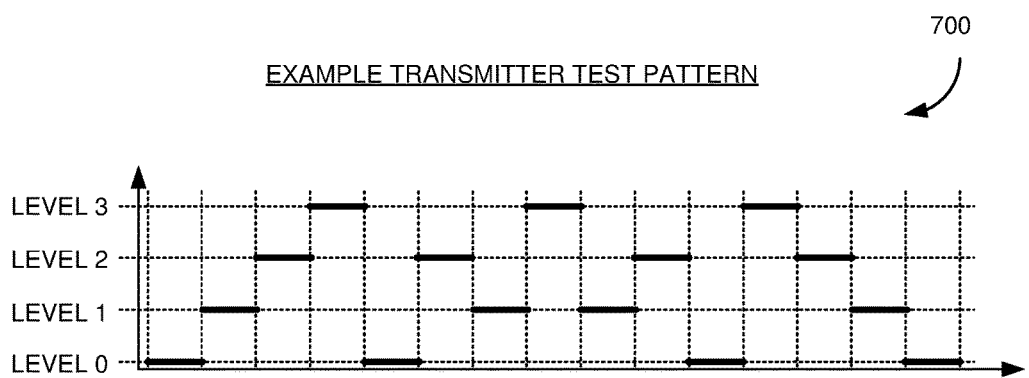
FIG. 7 illustrates an example transmitter test pattern utilized to determine step responses for a multi-level pulse amplitude modulated links according to embodiments.

FIG. 7 illustrates an example transmitter test pattern 700 utilized to determine step responses for a multi-level pulse amplitude modulated links according to embodiments. Referring to FIG. 7, the transmitter test pattern 700 can include a series of values that can be utilized by a driver to transmit signals having voltages corresponding to those values onto a channel. The output of the driver can be measured to determine the transition waveforms associated with the value changes in the transmitter test pattern 700. The transmitter test pattern 700 can include values that transition between each of the different value levels 0-3, both high-to-low and low-to-high. The transmitter test pattern 700 also can be Direct Current (DC)-balanced and possess a central symmetry.

In some embodiments, the transmitter test pattern 700 can prompt the driver to transmit signals with voltages associated with each value for multiple unit intervals. A unit interval can correspond to a time period available to transmit a signal having a voltage level corresponding value. For example, the first value in the transmitter test pattern 700 corresponds to a value level 0 and can range for 16 unit intervals, which can prompt the driver to generate signaling for the channel having a voltage level corresponding to a value level 0 for 16 unit intervals.

Referring back to FIGS. 5 and 6, the channel characterization unit 510 can include a channel transfer function unit 514 to determine a voltage transfer function for the channel based on the channel characteristics 502. In some embodiments, the channel characteristics 502 can include differential scattering parameters (S-Parameters) for the channel and a receiver package, and termination impendence. For example, the channel transfer function unit 514 can utilize the channel characteristics 502 to determine the voltage transfer function for the channel according to equation 1:

$$K_{ab}(s) = \frac{V_r(s)}{V_t(s)} = \frac{2S_{21}R_d}{(1+S_{11})(r_0+R_d) - (S_{21}S_{12}+S_{22})(r_0-R_d)} \quad (1)$$

The voltage transfer function $K_{ab}(s)$ can correspond to the voltage at the receiver $V_r(s)$ divided by the voltage at the transmitter $V_t(s)$. The differential S-parameters for the combination of the channel and the receiver package are shown in equation 1 as $S_{11}$, $S_{12}$, $S_{21}$, and $S_{22}$, while $R_d$ and $r_0$ shown in equation 1 correspond to termination and port normalization impedances, respectively, from the channel characteristics 502.

The channel characterization unit 510 can include a step response unit 516 to determine the step responses of the channel based on the transition waveforms output from the driver and the voltage transfer function for the channel. In some embodiments, the step response unit 516 can determine the step responses by converting the voltage transfer function into a time-domain response and separately convolving each of the transition waveforms with the time-domain version of the voltage transfer function. The step response unit 516 also can determine the step responses by differentiating the transition waveforms into "Dirac" responses, performing a Fourier transform on the "Dirac" responses, and multiplying the transformed responses with the voltage transfer function, before performing an inverse Fourier transform on the result.

In a block 602, the computing system implementing the channel analysis tool 500 can set a sampling position in a unit interval for the channel. The sampling position can correspond to time slice in the unit interval. For example, in FIG. 3, the unit interval corresponds to the x-axis in the eye diagram 301, and a sampling position would correspond to a particular time within the unit interval on the x-axis to perform sampling.

In a block 603, the computing system implementing the channel analysis tool 500 can include a level distribution boundary unit 520 to determine distribution boundaries for each signal encoding value level for the set sampling position. The distribution boundaries, in some embodiments, identify a maximum voltage and a minimum voltage for each value level on the channel, for example, determined for a value length of a response. For example, when transmitter drives the channel with signaling that communicates 10 values, the level distribution boundary unit 520 can determine a maximum voltage and a minimum voltage the channel should experience in response to the signaling of the 10 values at each of the different value level. Embodiments of determining the distribution boundaries for each signal encoding level will be described below with reference to FIGS. 8A and 8B.

Figure 8A:
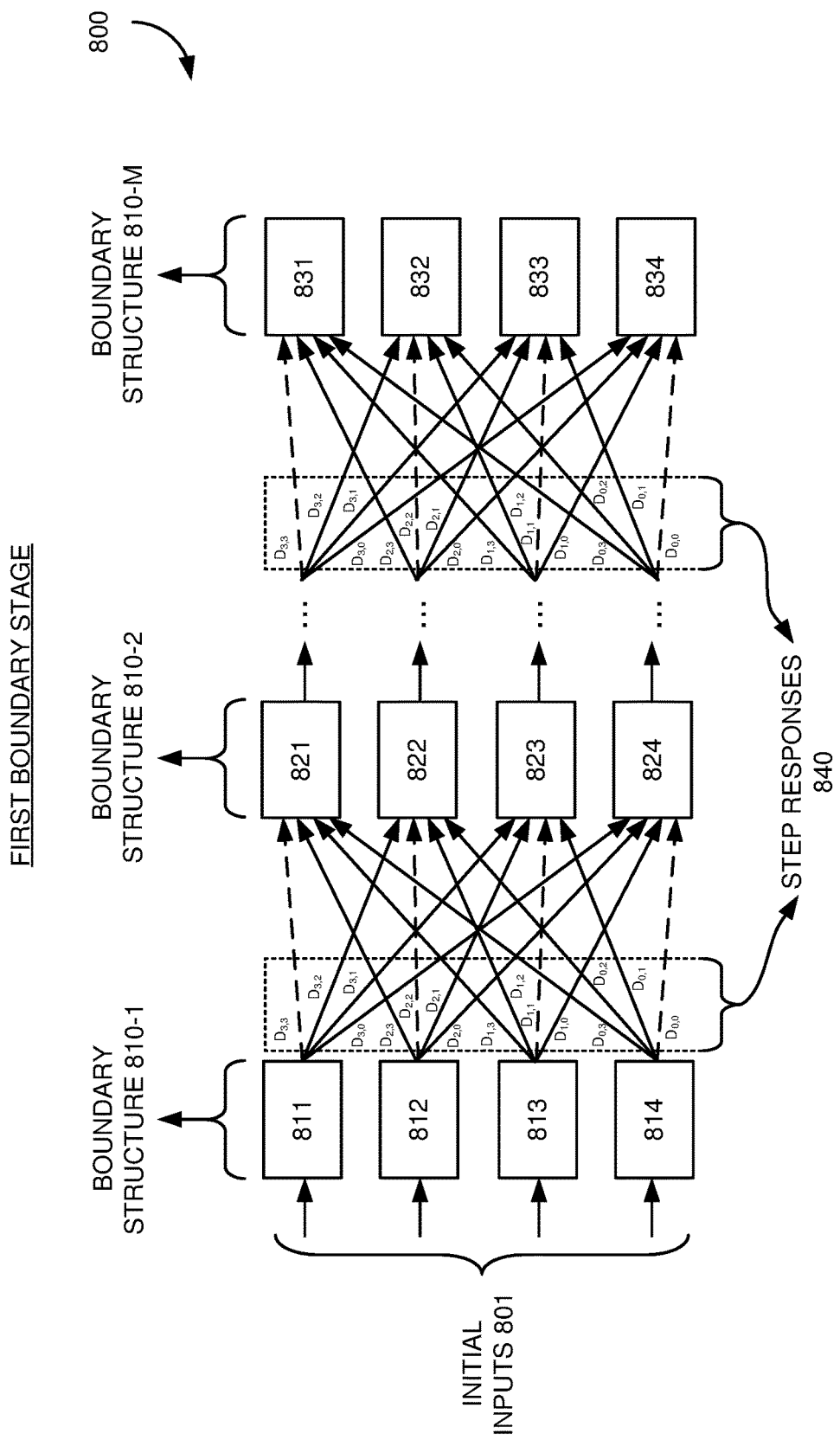
FIGS. 8A and 8B illustrate an example distribution boundary structure for determining distribution boundaries on each value level of a channel according to various embodiments.
Figure 8B:
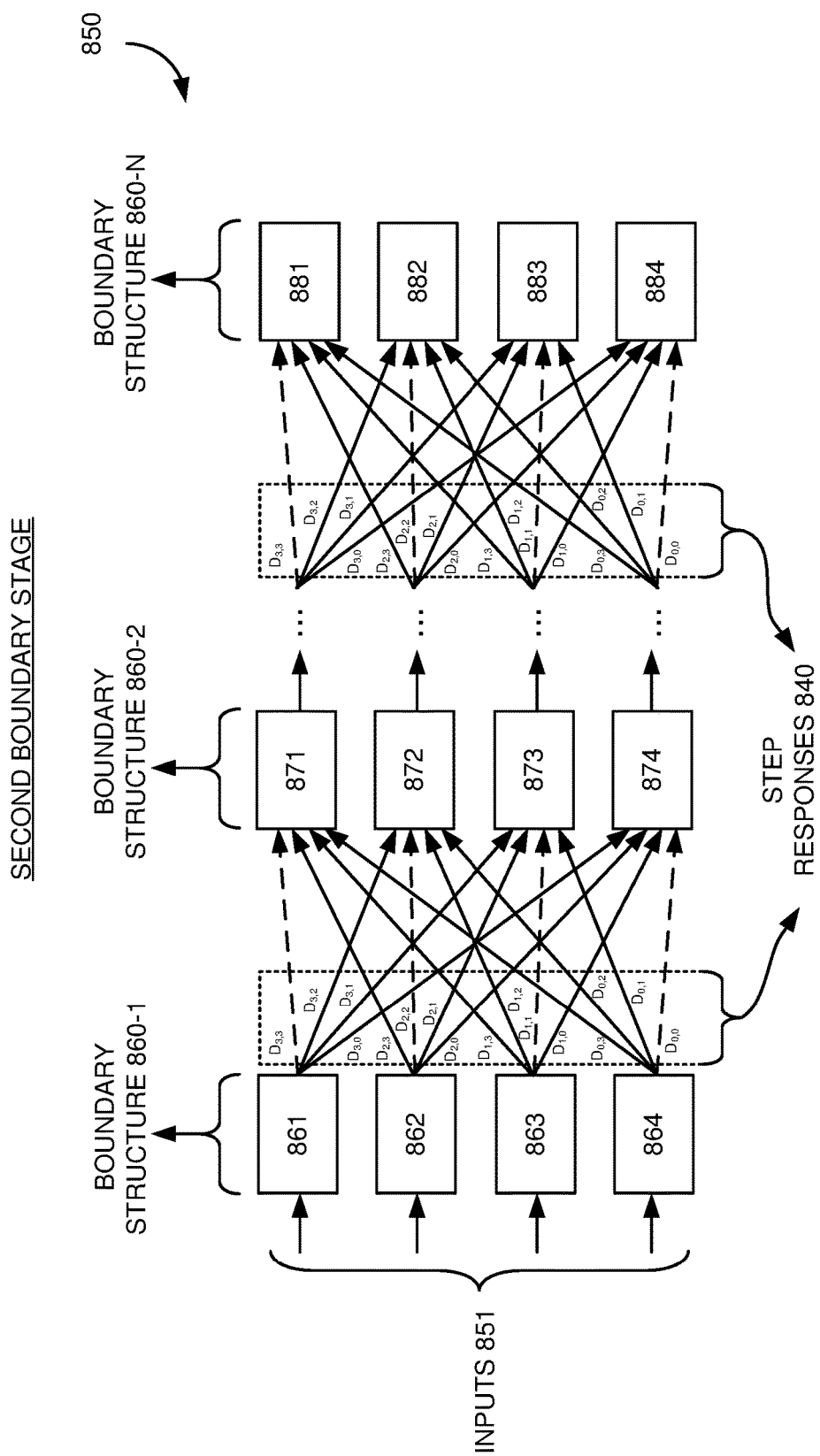

FIGS. 8A and 8B illustrate an example distribution boundary structure for determining distribution boundaries on each value level of a channel according to various embodiments. Referring to FIGS. 8A and 8B, the distribution boundary structure can determine the distribution boundaries for signals on each value level based on the step responses 840 of the channel. The distribution boundary structure can split the determination of the distribution boundaries into multiple stages, such as a first boundary stage 800 and a second boundary stage 850, for example, based on when the step responses 840 reach their peak values or approximately reach their peak values. For example, the first boundary stage 800 can be utilized to determine the distribution boundaries for signals on each value level until the step responses 840 reach their peak values, at which time the distribution boundary structure switches to utilizing the second boundary stage 850 to determine the distribution boundaries for signals on each value level. The combination of the first boundary stage 800 and the second boundary stage 850 can compute distribution boundaries for each value level at different sampling positions within a unit interval.

The first boundary stage 800 can evaluate upper and lower boundaries for each value level at the set sampling position within a unit interval of the signaling on a channel. The first boundary stage 800 can include multiple boundary structures 810-1 to 810-M corresponding to a different value within in the length of a response on the channel (in bits or values). Each of the boundary structures 810-1 to 810-M include state containers to compute upper and lower boundaries for a particular signal encoding level at a particular value in the response length in bits or values.

The boundary structure 810-1 includes state containers 811-814, which can to receive initial inputs 801. The state container 811 can correspond to encoding value level 3, or the highest level. The state container 812 can correspond to encoding value level 2, or the second highest level. The state container 813 can correspond to encoding value level 1, or the second lowest level. The state container 814 can correspond to encoding value level 0, or the lowest level. The initial inputs 801 can correspond to a voltage level of the encoding value level, or the step responses 840 for the value level at infinity. The state containers 811-814 can set their distribution boundaries, both upper boundary and the lower boundary, to the voltage level of their initial inputs 801.

Each of the state containers 811-814 in the boundary structure 810-1 can add portions of step responses 840 corresponding to a sampling position in the step response 840 to their respective upper boundary and the lower boundary. For example state container 811 can separately add the upper boundary to the portions of the step responses 840 corresponding to a transition from level 3 to level 0, corresponding to a transition from level 3 to level 1, corresponding to a transition from level 3 to level 2, and corresponding to a transition from level 3 to level 3. The state container 811 can perform the same additions substituting the lower boundary for the upper boundary. Each of the state containers 811-814 in the boundary structure 810-1 can perform the similar operations with their own upper and lower boundaries.

The 32 different derived values, 8 from each state container 811-814, can be sent to state containers 821-824 in the boundary structure 810-2. For example, the state container 821 in the boundary structure 810-2 can receive two sets of derived values from the boundary structure 810-1, one set of four derived values corresponding to upper boundaries added with step responses 840 and the other set of four derived values corresponding to lower boundaries added with the step responses 840. The state container 821 can take the maximum of the set of four derived values corresponding to upper boundaries added with the step response 840 as its upper boundary, and can take the minimum of the set of four derived values corresponding to the lower boundaries added with the step responses 840 as its lower boundary. Each of the other state containers 822-824 can perform similar determinations of their upper and lower boundaries based on the sets of derived values they received from the boundary structure 810-1. The state containers 821-824 can store their selected upper boundary and their selected lower boundary. In some embodiments, the state containers 821-824 can identify which of the state containers 811-814 provided them the derived value that they utilized to determine their upper and lower boundaries and store a pointer to the identified state container.

The state containers 821-824 can derive values similarly to state containers 811-814 using the upper and lower boundaries they determined and the portions of the step responses 840. The first boundary stage 800 can transition through each boundary structure until each state container 831-834 within the boundary structure 810-M has identified and stored upper and lower boundaries, and optionally also identified and stored pointers to state containers in a previous boundary stage that generated the identified upper and lower boundaries.

The distribution boundary structure can transition from the first boundary stage 800 to the second boundary stage 850 after the state container 831-834 within the boundary structure 810-M has identified and stored upper and lower boundaries. The second boundary stage 850 can operate similarly to the first boundary stage 800 except the upper and lower boundary can be determined separately for each value level in the second boundary stage 850.

The second boundary stage 850 can receive inputs 851, which can correspond to the upper and lower boundaries from the first boundary stage 800 corresponding to the value level under evaluation by the second boundary stage 850. For example, when the second boundary stage 850 determines upper and lower boundaries for the second value level, the state container 862 in the boundary structure 860-1 can receive the upper and lower boundaries from state container 832 in boundary structure 810-M. The other state containers 861, 863, and 864 in the boundary structure 860-1 can receive inputs 851 that set their upper boundaries to negative infinity or a large negative number and that set their lower boundaries to positive infinity or a large positive number. Each of the state containers 861-864 in the boundary structure 860-1, state containers 871-874 in boundary structure 860-1, and state containers 881-884 in boundary structure 860-N can operate similarly to the state containers in the first boundary stage 800. In this example, the second boundary stage 850 can determine the upper boundary for the second value level by selecting the largest upper boundary stored in one of the state containers 881-884, and can determine the lower boundary for the second value level by selecting the smallest lower boundary stored in one of the state containers 881-884. The second boundary stage 850 can repeat this process for the other value levels, i.e., the first, third, and fourth values, except that the value level being evaluated should be initialized with the upper and lower boundaries from the state containers in the first boundary stage 800.

After the distribution boundary structure has been utilized to determine the upper and lower boundaries for each of the four signaling levels at the current sampling position in the unit interval, the sampling position in the unit interval can be set to a new sampling position and the process to determine the upper and lower boundaries for each of the four signaling levels at the new sampling position in the unit interval. This process can iterate until there are no new sampling positions for evaluation by the distribution boundary structure.

In this example implementation of the distribution boundary structure there is no prehistory associated with the channel. In other implementations, a different distribution boundary structure can be built to accommodate prehistory values, for example, which would expand a number of state containers utilized in each boundary structure of the distribution boundary structure. For example, one value of prehistory can expand a number of state containers to 16 per boundary structure 810-1 to 810-M and 860-1 to 860-N. In this instance, the distribution boundary structure models a four-level signal encoding, such as PAM-4 encoding, and thus boundary structures 810-1 to 810-M and 860-1 to 860-N each include four state containers, i.e., one corresponding to each value level of the encoding. In some embodiments, the distribution boundary structure can be expanded to accommodate various levels of signal encoding.

Referring back to FIGS. 5 and 6, in a block 604, the computing system implementing the channel analysis tool 500 can identify boundaries of eye openings between adjacent signal encoding value levels based on the distribution boundaries. The distribution boundaries can describe an upper boundary and a lower boundary of voltage levels at each signal encoding value level. The channel analysis tool 500 can include an eye opening unit 530 to utilize the upper boundary and the lower boundary of voltage levels at each signal encoding value level to determine an opening of an eye between adjacent signal encoding value levels.

A lower eye, for example, between the lowest value level and the second lowest value level, can have a lower boundary corresponding to an upper boundary of the lowest value level. The lower eye can have an upper boundary corresponding to the smallest of the lower boundaries for the three highest value levels. A difference between the upper boundary and the lower boundary of the lower eye can be positive, meaning the eye is open, or it can be negative, meaning the eye is closed.

A middle eye, for example, between the second lowest value level and the second highest value level, can have a lower boundary corresponding to largest of the upper boundaries for the lowest value level and the second lowest value level. The middle eye can have an upper boundary corresponding to the smallest of the lower boundaries for the highest value level and the second highest value level. A difference between the upper boundary and the lower boundary of the middle eye can be positive, meaning the eye is open, or it can be negative, meaning the eye is closed.

An upper eye, for example, between the highest value level and the second highest value level, can have a lower boundary corresponding to an upper boundary of the three lowest value levels. The upper eye can have an upper boundary corresponding to the smallest of the lower boundary of the highest value levels. A difference between the upper boundary and the lower boundary of the upper eye can be positive, meaning the eye is open, or it can be negative, meaning the eye is closed.

In some embodiments, the eye opening unit 530 also can determine sampling times in the unit interval for each of the three eyes and determine vertical offsets based on a density of level distributions at each value level. The sampling times and the vertical offsets may be utilized in an optimization process, such as a Channel Operating Margin (COM) algorithm, or the like. For example, the sampling times can be utilized to select specific times to perform full statistical analysis, such as only performing the analysis at the sampling times, and reporting the worst ratio from the statistical analysis as the COM. The vertical offsets, for example, two for each eye, may be utilized as a signal magnitudes in the COM algorithm.

In an optional block 605, the computing system implementing the channel analysis tool 500 can include a worst case pattern unit 532 to generate worst case input patterns 504 corresponding to the distribution boundaries. The worst case patterns 504, when utilized to drive a channel with encoded signaling, can render all of the eyes the most stressed in terms of inter-symbol interference (ISI) between the upper and lower boundaries at each sampling position. The worst case pattern unit 532 can generate a worst case input pattern 504 for each eye boundary at each sampling position in the unit interval. In the case of PAM-4 signaling, each eye has two boundaries, so the worst case pattern unit 532 can generate 6 worst case input patterns 504 for each sampling position.

In some embodiments, the worst case pattern unit 532 can track which boundaries were utilized to determine the eye boundaries and build the worst case input patterns 504 based on the tracking. The level distribution boundary unit 520 can store links or pointers to whichever predecessor value level was utilized to formulate the upper and lower boundaries at each value in the entire response length. The worst case pattern unit 532 can track the links or pointers backward by setting the last value a worst case input pattern 504 to the first value in the worst case input pattern.

For example, to generate a worst case input pattern 504 for the upper boundary of an upper eye, the worst case pattern unit 532 can set the last value in the worst case input pattern 504 based on which state container was selected as storing the lower boundary for the highest value level. That state container can store a link or pointer to a preceding state container that provided the lower boundary to the state container. The worst case pattern unit 532 can set the second to last value in the worst case input pattern 504 based on a value level associated with the preceding state container. The tracking of the links or pointers backwards through the boundary distribution structure can allow the worst case pattern unit 532 to set all of the values in the worst case input pattern 504 for the upper boundary of the upper eye at that particular sampling position. The worst case pattern unit 532 can generate the worst case input patterns 504 for the other eye boundaries at that sampling position.

In a block 606, the computing system implementing the channel analysis tool 500 can determine whether to increment or alter the sampling position that was set in block 602. When the channel analysis tool 500 alters the sampling position, execution can return to block 603 for the new sampling position. Otherwise, execution can proceed to block 607, where the computing system implementing the channel analysis tool 500 can predict a signal integrity of the channel identified boundaries of the eye openings. In some embodiments, the channel analysis tool 500 can include a signal integrity prediction unit 540 to generate bit error rate (BER) or an eye diagram 506 based on statistical simulation, based on the identified eye boundaries, based on the worst case input patterns 504, or the like. Embodiments of an example eye diagram will be described below with reference to FIGS. 9A and 9B.

Figure 9A:
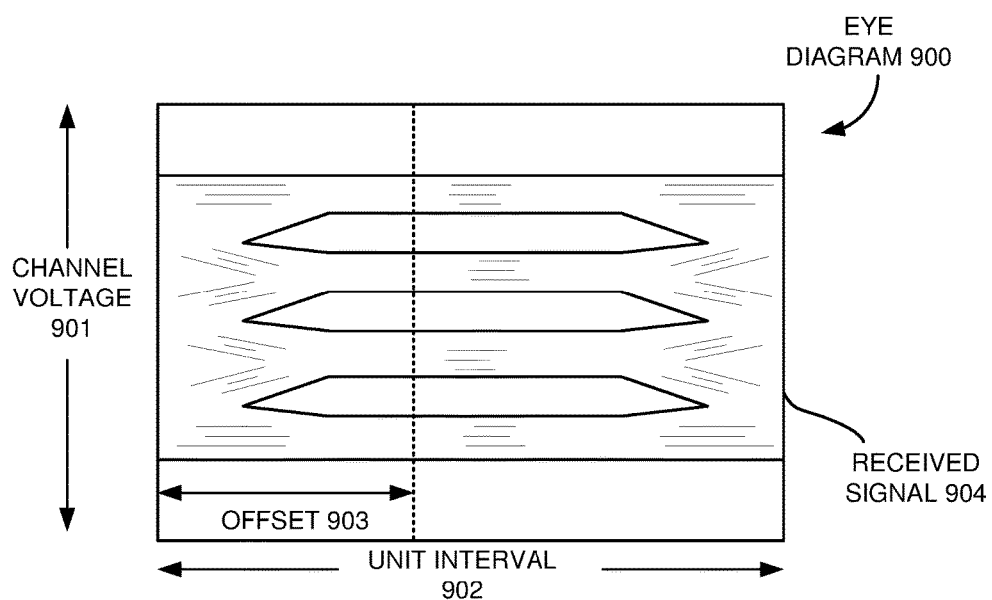
FIGS. 9A and 9B illustrate an example eye diagram 900 showing signal integrity of a channel according to various embodiments.
Figure 9B:
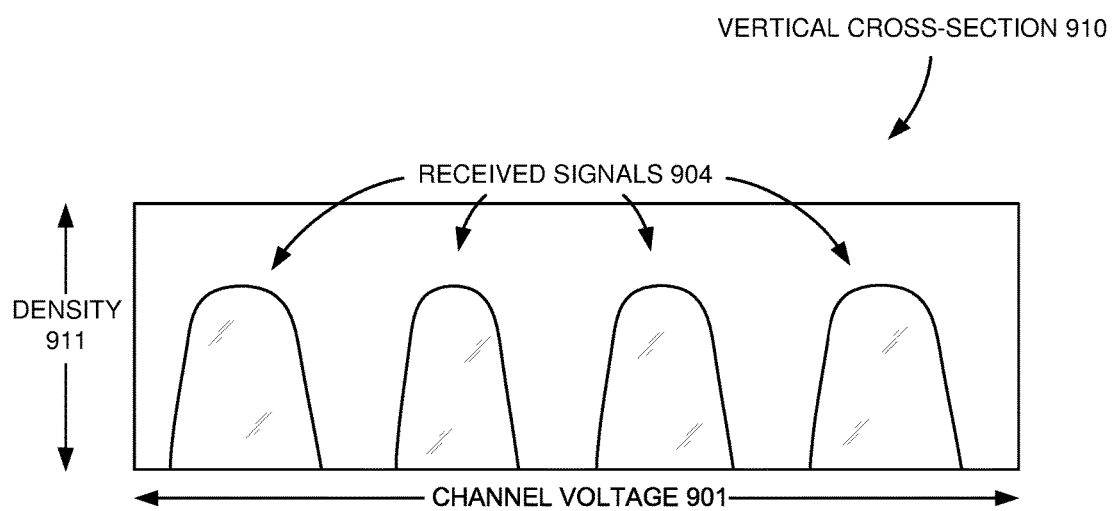

FIGS. 9A and 9B illustrate an example eye diagram 900 showing signal integrity of a channel according to various embodiments. Referring to FIGS. 9A and 9B, an eye diagram 900 has a channel voltage 901 corresponding to the y-axis and a unit interval 902 corresponding to the x-axis. The unit interval 902 can correspond to a period of time that a value can be transmitted over the channel. The graph shows signals 904 received over the channel overlapped based on their corresponding unit interval 902. The signals 904 in the eye diagram 900 can identify both their voltage at various times during the value interval 902, but, in some embodiments, also be presented as a density or frequency of their occurrence at a specific time-voltage intersection, for example, by a color in the eye diagram 900.

An offset 903 or sampling position is also shown in FIG. 9A to illustrate how the offset 903 corresponds to the vertical cross-section 910 of the eye diagram 900. The vertical cross-section 910 of the eye diagram 900 can have the channel voltage 901 corresponding to the x-axis and a density 911 corresponding to the y-axis. The density 911 can correspond to a frequency or probability signals 904 received over the channel at different channel voltages 901. A magnitude of the received signals 904 in the vertical cross-section of the eye diagram 910 along the y-axis can be represented in the eye diagram 900 of FIG. 9A as a color of the received signals 904.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments, those skilled in the art will appreciate that there are numerous variations and permutations of the above described systems and techniques that fall within the spirit and scope as set forth in the appended claims. For example, while specific terminology has been employed above to refer to certain processes, it should be appreciated that various examples may be implemented using any desired combination of processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   characterizing a channel of an electronic device capable of communicating signals encoding data in more than two value levels, wherein the characterization of the channel identifies multiple step responses of the channel, each step response corresponding to a transition between a plurality of the value levels;
   determining, by a computing system, distribution boundaries of the signals at each of the value levels by deriving, for each of the value levels, voltages of the signals capable of being communicated on the channel based, at least in part, on the step responses of the channel, and identifying a maximum voltage and a minimum voltage of the signals for each of the value levels based on the derived voltages of the signals, wherein the distribution boundaries correspond to the maximum voltage and the minimum voltage of the signals at each of the value levels; and
   predicting, by the computing system, a signal integrity of the channel based, at least in part, on the distribution boundaries of the signals at each of the value levels.

2. The method of claim 1, wherein predicting the signal integrity of the channel further comprising at least one of generating a bit error rate for the channel or developing an eye diagram representing the signal integrity of the channel.

3. The method of claim 1, further comprising identifying, by the computing system, boundaries of eye openings between adjacent value levels based, at least in part, on the distribution boundaries of the signals at each of the value levels.

4. The method of claim 1, further comprising generating, by the computing system, multiple input patterns from the distribution boundaries of the signals, wherein the channel is configured to output voltages corresponding to the distribution boundaries of the signals in response to being driven with input voltages generated based on the input patterns.

5. The method of claim 4, wherein predicting the signal integrity of the channel further comprises generating an eye diagram representing the signal integrity of the channel based on the output voltages identified based on the input patterns.

6. A system comprising:
   a memory system configured to store computer-executable instructions; and
   a computing system, in response to execution of the computer-executable instructions, is configured to:
      characterize a channel of an electronic device capable of communicating signals encoding data in more than two value levels, wherein the characterization of the channel identifies multiple step responses of the channel, each step response corresponding to a transition between a plurality of the value levels;
      determine distribution boundaries of the signals at each of the value levels by deriving, for each of the value levels, voltages of the signals capable of being communicated on the channel based, at least in part, on the step responses of the channel, and identifying a maximum voltage and a minimum voltage of the signals for each of the value levels based on the derived voltages of the signals, wherein the distribution boundaries correspond to the maximum voltage and the minimum voltage of the signals at each of the value levels; and
      predict a signal integrity of the channel based, at least in part, on the distribution boundaries of the signals at each of the value levels.

7. The system of claim 6, wherein the computing system, in response to execution of the computer-executable instructions, is further configured to predict the signal integrity of the channel by at least one of generating a bit error rate for the channel or developing an eye diagram representing the signal integrity of the channel.

8. The system of claim 6, wherein the computing system, in response to execution of the computer-executable instructions, is further configured to identify boundaries of eye openings between adjacent value levels based, at least in part, on the distribution boundaries of the signals at each of the value levels.

9. The system of claim 6, wherein the computing system, in response to execution of the computer-executable instructions, is further configured to generate multiple input patterns from the distribution boundaries of the signals, wherein the channel is configured to output voltages corresponding to the distribution boundaries of the signals in response to being driven with input voltages generated based on the input patterns.

10. An apparatus comprising at least one computer-readable memory device storing instructions configured to cause one or more processing devices to perform operations comprising:
   characterizing a channel of an electronic device capable of communicating signals encoding data in more than two value levels, wherein the characterization of the channel identifies multiple step responses of the channel, each step response corresponding to a transition between a plurality of the value levels;

determining distribution boundaries of the signals at each of the value levels by deriving, for each of the value levels, voltages of the signals capable of being communicated on the channel based, at least in part, on the step responses of the channel, and identifying a maximum voltage and a minimum voltage of the signals for each of the value levels based on the derived voltages of the signals, wherein the distribution boundaries correspond to the maximum voltage and the minimum voltage of the signals at each of the value levels; and predicting a signal integrity of the channel based, at least in part, on the distribution boundaries of the signals at each of the value levels.

11. The apparatus of claim 10, wherein predicting the signal integrity of the channel further comprising at least one of generating a bit error rate for the channel or developing an eye diagram representing the signal integrity of the channel.

12. The apparatus of claim 10, wherein the instructions are configured to cause the one or more processing devices to perform operations further comprising identifying boundaries of eye openings between adjacent value levels based, at least in part, on the distribution boundaries of the signals at each of the value levels.

13. The apparatus of claim 10, wherein the instructions are configured to cause the one or more processing devices to perform operations further comprising generating multiple input patterns from the distribution boundaries of the signals, wherein the channel is configured to output voltages corresponding to the distribution boundaries of the signals in response to being driven with input voltages generated based on the input patterns.

14. The apparatus of claim 13, wherein predicting the signal integrity of the channel further comprises generating an eye diagram representing the signal integrity of the channel based on the output voltages identified based on the input patterns.

* * * * *